Nov. 21, 1939.    Y. A. BOUGET ET AL    2,180,393
CONTROL MECHANISM FOR MATERIAL MIXING APPARATUS
Filed Dec. 18, 1936
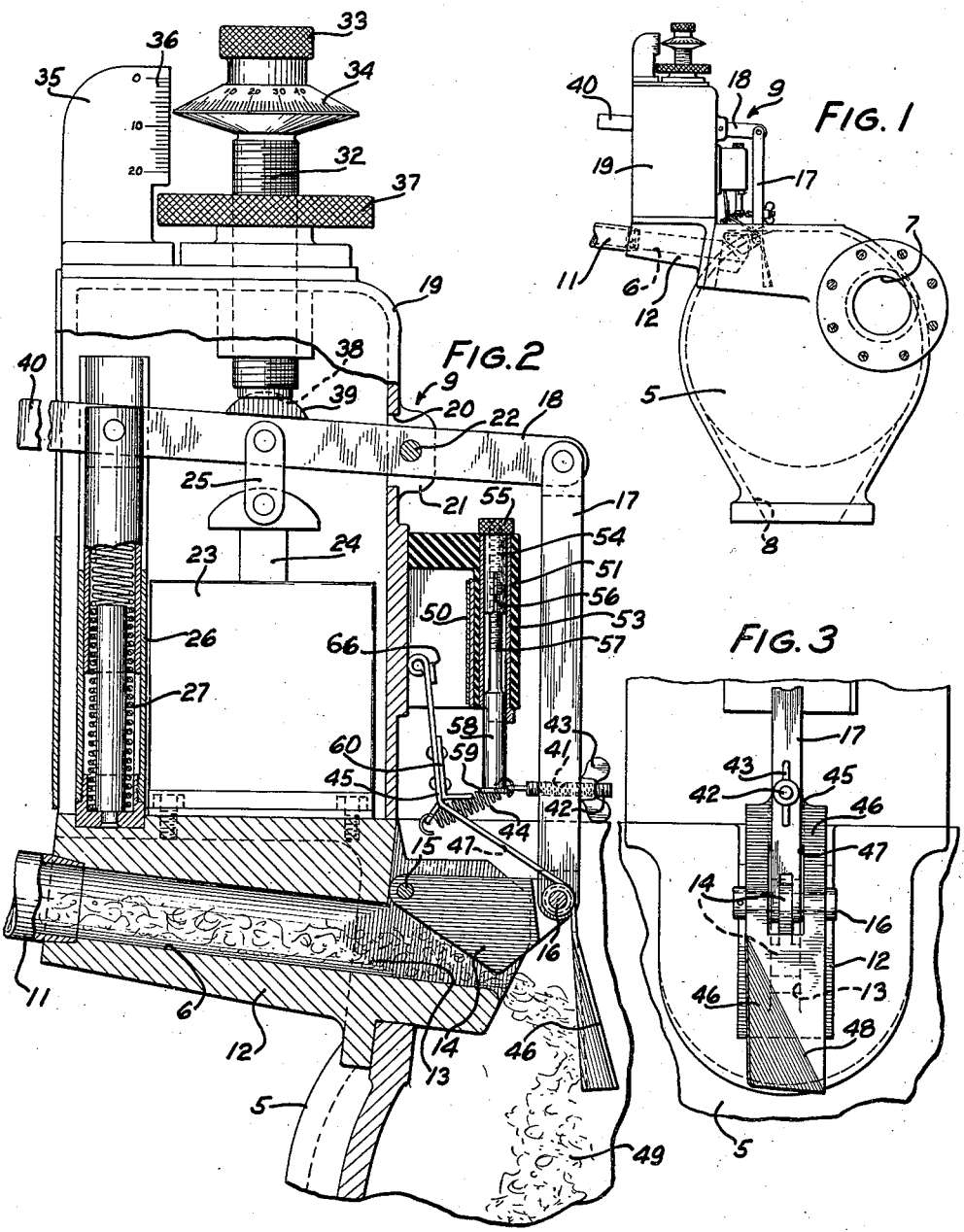
INVENTORS
Y. A. BOUGET
J. N. SELVIG
BY E. R. Nowlan
ATTORNEY Patented Nov. 21, 1939

2,180,393

UNITED STATES PATENT OFFICE 2,180,393

CONTROL MECHANISM FOR MATERIAL MIXING APPARATUS

Yves A. Bouget, West Orange, and John N. Selvig, Westfield, N. J., assignors to Western Electric Company, Incorporated, New York, N. Y., a corporation of New York Application December 18, 1936, Serial No. 116,626

7 Claims. (Cl. 137—152)

This invention relates to control mechanism for material mixing apparatus, and more particularly to apparatus for controlling the flow of material through a passage.

It is an object of the present invention to provide a simple and economically constructed apparatus for controlling the flow of material through a passage.

In accordance with one embodiment of the invention as applied to apparatus for mixing a fibrous pulp with water prior to its application to a wire as an insulating compound, a mixing bowl is provided having a globular configuration and having a pair of orifices through which a suspension of fibrous pulp in the water and a stream of water may be directed into the bowl tangentially with considerable force to impart a swirling centrifugal action to the streams directed into the bowl to thereby cause a uniform mixing of the two streams before the discharge thereof through a restricted opening in the bottom of the bowl. The stream of pulp in water directed into the mixing bowl is accurately controlled by means of an adjustable gate controlled by a graduated knob to accurately determine the amount of the suspension directed into the mixing bowl. A vane positioned within the bowl and in the path of the suspension of pulp in water controls electrical apparatus for opening the gate to flush the orifice when the orifice becomes clogged and reduces the flow of pulp.

Other objects and advantages of the invention will become apparent from a consideration of the following detailed description when considered in conjunction with the acompanying drawing, wherein Fig. 1 is an elevational view of a mixing bowl and the control mechanism therefor embodying the features of the invention;

Fig. 2 is an enlarged detail view of the mechanism for regulating the flow of pulp to the mixing bowl, parts being broken away to more clearly illustrate the apparatus, and Fig. 3 is a fragmentary detail view of a portion of the apparatus shown in Fig. 2.

Referring now to the drawing, wherein like reference characters designate the same parts throughout the several views, a mixing bowl 5 having a globular configuration is provided with a supply orifice 6 through which a pulp comprising a suspension of fibrous matter in water may be directed into the mixing bowl to be mixed thoroughly with water directed into the bowl through a second orifice 7. As will be noted by reference to Fig. 1, the orifices 6 and 7 are positioned to direct the streams of material tangentially into the mixing bowl to impart a swirling action to the material and thereby thoroughly mix it. The mixing bowl 5 has a restricted discharge outlet 8 in the bottom thereof which may be connected to a pipe line for directing the mixture to other processing apparatus. In apparatus for mixing pulp to be formed into paper for various uses; for example, the paper which is to be applied to electrical conductors as an insulator, the percentage of fibrous matter to be mixed with the carrying medium, which may be water, is highly critical, and therefore the water directed through the entrance orifice 7 should be measured accurately. This may be done by means of any suitable valve not shown. The amount of pulp, which in this case is fibrous matter suspended in water, is measured accurately by control apparatus designated generally by the numeral 9 and shown in detail in Fig. 2.

The pulp which, in a typical case, comprises a mixture of fibrous matter suspended in water, is directed from a preliminary mixing mechanism (not shown) through a pipe 11 to the orifice 6 which is formed in a block 12 mounted upon the side of the mixing bowl 5. The orifice 6 is tapered at 13 from a round to a rectangular shape so that a cooperating rectangular shaped gate 14 utilized for closing the orifice may be moved in the orifice to regulate the amount of pulp flowing therethrough. The gate 14, which is pivoted to the block 12 at 15, is substantially triangular in configuration and rectangular in cross-section, presenting an elongated, flat, smooth surface to the stream of pulp. The gate 14 is mounted so that the elongated surface is presented at an angle approximating the flow axis of the pulp through the orifice 6. All parts of the surface of the gate are consequently subjected to a pulp flow at a uniform velocity and the sides of the gate being in close engagement with the flat wall of the orifice, no irregular surfaces will be presented to the stream of pulp which would tend to catch particles of fiber and clog the orifice. At the end of the gate 14 opposite to the pivot point 15, there is pivotally secured to the gate at 16 an actuating rod 17. The rod 17 is pivotally connected at its upper end to a lever 18.

Mounted upon the block 12 is a control box 19 having an aperture 20 formed therein through which the lever 18 extends and at the side of which a bracket 21 is formed for pivotally supporting the lever 18 at 22. Positioned within the control box 19 is a coil 23 of a solenoid having a movable core 24, which is connected to the lever 18 by a link 25. Also mounted within the control box 19 is a dash pot 26 for regulating the speed of movement of the lever 18 under the influence of the solenoid core 24. The dash pot is of a conventional type and is provided with a coil spring 27 for normally urging the lever 18 to rock about its pivot 22 in a clockwise direction.

Threaded in the upper end of the control box 19 is a limit screw 32 having a knurled portion 33 whereby it may be operated, and having a dial 34 formed thereon for cooperation with a scale 35 having suitable graduations 36 inscribed thereon whereby the position of the screw 32 may be regulated with a high degree of precision, a knurled lock nut 37 being provided for locking the screw 32 in position after it has been suitably adjusted. The lower end of the screw 32 has a concave surface 38 formed on the bottom thereof for cooperating with a convex surface of a limit cam 39 secured to the lever 18. The lever 18 also has an extending portion 40 which extends to the left, (Figs. 1 and 2) beyond the control box to permit the manual operation of the gate when it is desired to operate it manually.

An aperture 41 is formed in the actuating rod 17 intermediate its ends for receiving a threaded member 42 which has a thumb nut 43 threaded on the right end thereof (Fig. 2) and which has a spring 44 fixed to the left end thereof. The spring 44 normally urges a contact lever 45, carrying a contact 66 and pivoted to the gate 14 and rod 17 at 16, to the right (Fig. 2). The lever 45 has formed integrally therewith a vane 46 which is slotted at 47 for receiving the rod 17 to which the vane 46 is pivoted at 16. The vane 46 is bent as shown at 48 to aid in deflecting the stream of pulp 49 tangentially against the wall of the bowl 5.

The contact 66 cooperates with a contact 50 mounted in a contact support 51 made of insulating material and suitably secured to the control box 19. Positioned in the contact support 51 is a metallic sleeve 53 for slidably receiving a threaded tube 54 having a knurled portion 55 and slotted at 56 to clamp a reduced, threaded portion 57 of a plunger 58. The plunger 58 and the threaded tube 54 are slidable within the metallic sleeve 53 and serve a purpose which will become apparent as the description progresses. The plunger 58 has a shoulder 59 formed on the lower end thereof for engaging a bracket 60 secured to the lever 45, the purpose of which will also become apparent as the description progresses.

It is believed that a better understanding of the invention will be had by describing briefly the mode of operation of the device and therefore let it be assumed that it is desired to reduce pulp, comprising a suspension of approximately 1.15% of fibrous matter in water, to a mixture wherein there is approximately .18% of fibrous matter in the water. In order to perform this mixing operation and maintain the amount of fibrous matter within reasonable limits, the gate 14 can be adjusted by means of the screw 32 to a position where the desired mixture will be produced. After having so adjusted the gate, any clogging of the orifice 6 will reduce the amount of fibrous matter in the ultimate mixture and accordingly the vane 46 has been placed in the path of the pulp entering the mixing bowl through the orifice 6 so that it will be held in a predetermined position by the pulp flowing through the orifice. Any clogging of the orifice will obviously reduce the amount of pulp 49 flowing against the vane 46 and will permit the spring 44 to move the vane and its associated lever 45 in a clockwise direction. Movement of the vane in a clockwise direction will result in the contact 66 engaging the contact 50. The engagement of the contact 50 by the contact 66 will complete an electrical circuit (not shown) to energize the coil 23, which will thereupon attract its movable core 24 and rock the lever 18 in a counterclockwise direction about its pivot 22. As the contact 66 is moved into engagement with the contact 50, the lower end of the bracket 60 will pass under the shoulder 59 on the plunger 58 and as the coil 23 attracts its core 24 to move the gate 14 in a counterclockwise direction about its pivot 15, thereby to flush the orifice 6, the plunger 58 and its associated tubular member 54 will be carried upwardly by the bracket 60, the dash pot 26, of course, regulating the rate of movement of the movable parts. As the plunger 58 and tubular member 54 are carried upwardly and the gate 14 is opened, the increased flow of pulp through the orifice 6 will flush the obstruction out of the orifice and the increased stream of pulp will strike the vane 46, thereby to open the circuit to the coil 23 and permit the plunger 58 to drop down to the position shown. The stream of pulp 49 will then force the vane 46 to the right, (Fig. 2) and in so doing, the bracket 60 will be held away from the plunger 58 so long as the stream of pulp continues to flow at the predetermined rate or at a greater rate than the predetermined rate. This condition will be maintained until the gate 14 moves back to the position where the screw 32 holds the gate in its adjusted position unless the flow of pulp through the orifice 6 is reduced by clogging of the orifice. If the orifice 6 again becomes clogged before the gate 14 reaches its normal position, bracket 60 will strike the side of the plunger 58 and the contact 66 will not be permitted to engage the contact 50 until the gate 14, vane 46, and lever 45 reach their normal positions, whereupon the horizontal portion of the bracket 60 will slip over the shoulder 59 and the circuit to the coil 23 will again be closed by the engagement of the contact 66 with the contact 50 to initiate another flushing cycle.

The normal position of the gate 14, as pointed out hereinbefore, may be adjusted by means of the screw 32 and the speed of operation of the lever 18 may be regulated in the conventional manner by properly adjusting the resistance of the dash pot 26. In like manner, the normal position of the plunger 58 may be varied by means of the knurled head 55 of the tubular member 54 which may be turned with respect to the plunger 58 and due to the formation thereof will lock the tube on the threaded portion of the plunger 58.

What is claimed is:

1. Control mechanism for a passage comprising, a gate in said passage for regulating the amount of material normally passing through said passage, an adjustable indicating means for limiting the movement of said gate in one direction, and means responsive to the flow of material through the passage for moving the gate in the opposite direction upon a reduction of flow of material through the passage.

2. Control mechanism for a passage comprising, a gate positioned in said passage for regulating the normal flow of material therethrough, a vane pivotally connected with said gate and having a portion thereof in the path of material discharged from said passage, a contact movable by said vane, a solenoid coil operable under control of said contact on reduction of material flow, a solenoid core for opening said gate upon energization of the solenoid coil, a retarding mechanism for regulating the speed of operation of the gate, means for controlling the normal position of the gate, and means for rendering the contact inoperative during the movement of the gate to its normal position.

3. In a material mixing apparatus, a gate for regulating the flow of material to be mixed, means to limit the movement of said gate in a closing direction, means responsive to a reduction in the flow of said material past the gate for completing an electrical circuit, means controlled by said electrical circuit for opening the gate, and means for holding said electrical circuit open during the movement of the gate towards closed position.

4. In a material mixing apparatus, a gate for regulating the flow of a material to be mixed, contact operating means responsive to the flow of material past said gate, means controlled by the contact operating means for opening the gate, and means for rendering said contact operating means ineffective for a predetermined variable period for each operation of the contact operating means.

5. In a material mixing apparatus, a gate for regulating the flow of a material to be mixed, contact operating means responsive to the flow of material past said gate, and means for rendering said contact operating means ineffective for a predetermined variable period for each operation of the contact operating means including a plunger movable by said contact operating means upon the operation thereof and movable into the path of the contact operating means to hold it inoperative for a predetermined variable period after each operation thereof.

6. Control apparatus for controlling the flow of material from a passage, an adjustable closure member for said passage including means to limit its movement in a closing direction, means positioned in the path of material directed through said passage and responsive to a reduction in the flow of material for completing an electrical circuit, means controlled by said electrical circuit for moving the closure member toward its open position, and means for retarding movement of said closure means toward its open position.

7. A control apparatus for a passage including a gate movable in said passage, means for accurately controlling the position of said gate to limit its movement in a closing direction, an additional means for controlling the position of said gate including a vane positioned in the path of the material discharged from said passage, and movable to a predetermined position upon a reduction in the flow of material, and electrical apparatus controlled by said vane for moving the gate toward its open position when the vane moves to said predetermined position.

YVES A. BOUGET.
JOHN N. SELVIG.